United States Patent
Gandhasri

(10) Patent No.: US 10,170,148 B2
(45) Date of Patent: Jan. 1, 2019

(54) SELECTIVE ARRANGEMENT OF MEDIA IN A STORAGE SYSTEM

(71) Applicant: International Business Machines Corporation, Armonk, NY (US)

(72) Inventor: Rajamohan Gandhasri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/589,862

(22) Filed: May 8, 2017

(65) Prior Publication Data

US 2018/0322900 A1 Nov. 8, 2018

(51) Int. Cl.
*G11B 15/68* (2006.01)
*G11B 17/22* (2006.01)
*B25J 9/16* (2006.01)

(52) U.S. Cl.
CPC ........... *G11B 15/689* (2013.01); *B25J 9/1602* (2013.01); *G11B 15/682* (2013.01); *G11B 15/6835* (2013.01); *G11B 17/22* (2013.01)

(58) Field of Classification Search
CPC .......................... G11B 15/689; G11B 15/6835
See application file for complete search history.

(56) References Cited

U.S. PATENT DOCUMENTS

| | | | |
|---|---|---|---|
| 5,287,459 A | 2/1994 | Gniewek | |
| 5,423,018 A | 6/1995 | Dang et al. | |
| 5,719,983 A * | 2/1998 | Henderson | G06F 3/0601 348/E7.073 |
| 5,740,061 A | 4/1998 | Dewey et al. | |
| 5,884,298 A * | 3/1999 | Smith, II | G11B 27/002 |
| 5,983,318 A * | 11/1999 | Willson | G06F 12/122 369/30.31 |
| 6,029,230 A | 2/2000 | Ng | |
| 8,311,663 B2 * | 11/2012 | Haustein | G06F 3/0617 700/218 |
| 9,111,220 B2 * | 8/2015 | Prahlad | G06N 5/04 |
| 2004/0172507 A1 * | 9/2004 | Garthwaite | G06F 12/0276 711/159 |
| 2005/0192829 A1 * | 9/2005 | Zandt | G06Q 20/209 705/24 |
| 2006/0254862 A1 * | 11/2006 | Hoersten | G06Q 10/06311 186/52 |
| 2014/0214195 A1 * | 7/2014 | Worsley | G05D 1/0287 700/217 |
| 2015/0231783 A1 * | 8/2015 | Miller | B25J 9/1602 700/214 |

(Continued)

*Primary Examiner* — Thomas Randazzo
(74) *Attorney, Agent, or Firm* — Zilka-Kotab, P.C.

(57) ABSTRACT

A computer-implemented method, according to one embodiment, includes: maintaining a reference count and an access count for each of a plurality of objects stored in an optical media storage system, using the reference count and access count to create a popularity metric for each of the plurality of objects, for each medium having one or more of the plurality of objects, creating a medium popularity metric based on the popularity metrics of the one or more objects on the respective medium, and using the medium popularity metric of each respective optical medium to arrange the optical media in the optical media storage system. Other systems, methods, and computer program products are described in additional embodiments.

20 Claims, 6 Drawing Sheets

(56) References Cited

U.S. PATENT DOCUMENTS

2016/0257493 A1* 9/2016 Astigarraga .............. B65C 3/26
2017/0236155 A1* 8/2017 Manthina ........... G06Q 30/0255
                                                                705/14.53

* cited by examiner

SELECTIVE ARRANGEMENT OF MEDIA IN A STORAGE SYSTEM

BACKGROUND

The present invention relates to data storage systems, and more particularly, this invention relates to selectively arranging optical media in a storage system.

Automated data storage libraries are known for providing cost effective storage and retrieval of large quantities of data. The data in automated data storage libraries is typically stored on media which is stored in the library in a fashion that renders the media, and its resident data, accessible for physical retrieval. Such media is commonly termed "removable media." Data storage media may comprise any type of media on which data may be stored and which may serve as removable media, e.g., such as optical media which may include optical tape or discs.

In addition to data storage media, automated data storage libraries typically comprise data storage drives that store data to, and/or retrieve data from, the media. Further, automated data storage libraries typically comprise I/O stations at which media are supplied or added to, or removed from, the library. The transport of media between data storage locations, data storage drives, and I/O stations is typically accomplished by one or more accessors. Such accessors have grippers for physically retrieving the selected media from the storage locations within the automated data storage library and transporting such cartridges to the data storage drives by moving, for example, in the horizontal (X) and vertical (Y) directions.

SUMMARY

A computer-implemented method, according to one embodiment, includes: maintaining a reference count and an access count for each of a plurality of objects stored in an optical media storage system, using the reference count and access count to create a popularity metric for each of the plurality of objects, for each medium having one or more of the plurality of objects, creating a medium popularity metric based on the popularity metrics of the one or more objects on the respective medium, and using the medium popularity metric of each respective optical medium to arrange the optical media in the optical media storage system.

A computer program product, according to another embodiment, includes a computer readable storage medium having program instructions embodied therewith. The computer readable storage medium is not a transitory signal per se. The program instructions are readable and/or executable by a processor to cause the processor to perform a method which includes: incrementing a reference count of an object stored in an optical media storage system in response to referencing the object, incrementing an access count of the object stored in the optical media storage system in response to accessing the object, updating a popularity metric of the object in response to incrementing the reference count and/or access count, updating a medium popularity metric of the medium on which the object is stored in response to updating the popularity metric of the object, and arranging the optical media in the optical media storage system based on the updated medium popularity metric.

A system, according to yet another embodiment, includes: a processor, and logic integrated with the processor, executable by the processor, or integrated with and executable by the processor. The logic is configured to: increment a reference count of an object stored in an optical media storage system in response to referencing the object, increment an access count of the object stored in the optical media storage system in response to accessing the object, update a popularity metric of the object in response to incrementing the reference count and/or access count, update a medium popularity metric of the medium on which the object is stored in response to updating the popularity metric of the object, and arrange the optical media in the optical media storage system based on the updated medium popularity metric.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
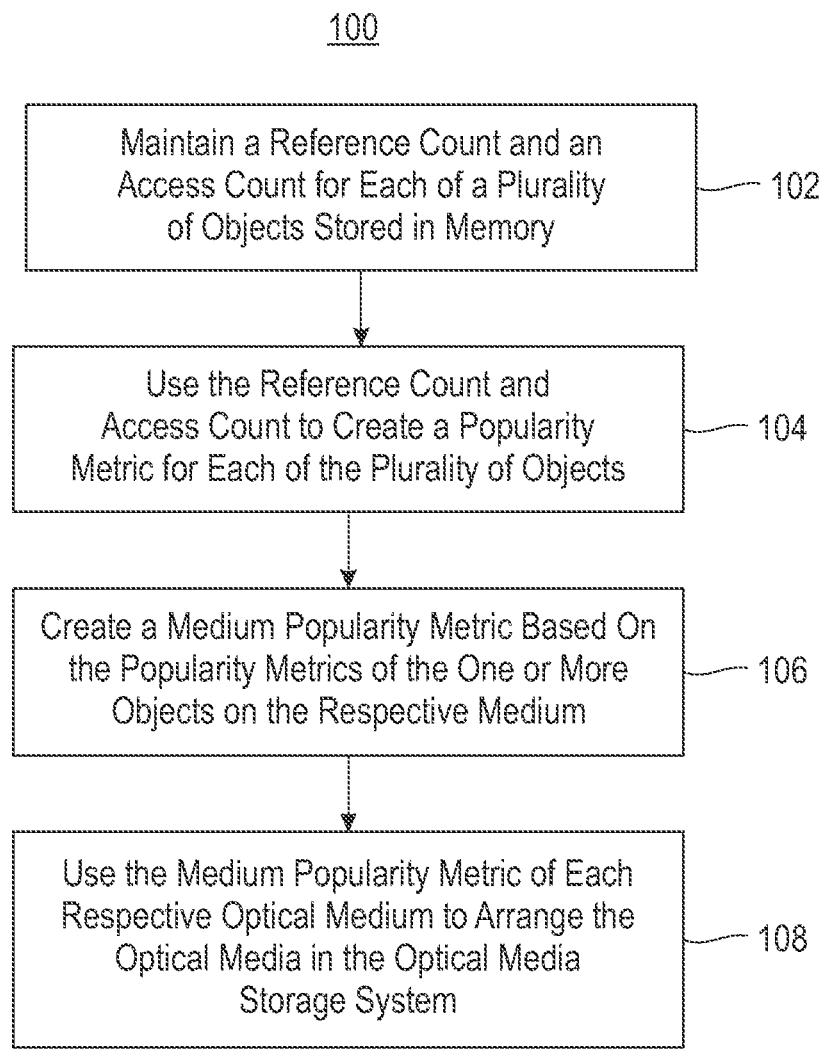
FIG. 1 is a flowchart of a method in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof, which are able to significantly improve data access times. By implementing reference and/or access counts for each object stored in an optical media storage system, the storage system may be able to maintain a popularity metric of each of the objects which may be used to achieve the improvements to data access times, e.g., as will be described in further detail below.

In one general embodiment, a computer-implemented method includes: maintaining a reference count and an access count for each of a plurality of objects stored in an optical media storage system, using the reference count and access count to create a popularity metric for each of the plurality of objects, for each medium having one or more of the plurality of objects, creating a medium popularity metric based on the popularity metrics of the one or more objects on the respective medium, and using the medium popularity metric of each respective optical medium to arrange the optical media in the optical media storage system.

In another general embodiment, a computer program product includes a computer readable storage medium having program instructions embodied therewith. The computer readable storage medium is not a transitory signal per se. The program instructions are readable and/or executable by a processor to cause the processor to perform a method which includes: incrementing a reference count of an object stored in an optical media storage system in response to referencing the object, incrementing an access count of the object stored in the optical media storage system in response to accessing the object, updating a popularity metric of the object in response to incrementing the reference count and/or access count, updating a medium popularity metric of the medium on which the object is stored in response to updating the popularity metric of the object, and arranging the optical media in the optical media storage system based on the updated medium popularity metric.

In yet another general embodiment, a system includes: a processor, and logic integrated with the processor, executable by the processor, or integrated with and executable by the processor. The logic is configured to: increment a reference count of an object stored in an optical media storage system in response to referencing the object, increment an access count of the object stored in the optical media storage system in response to accessing the object, update a popularity metric of the object in response to incrementing the reference count and/or access count, update a medium popularity metric of the medium on which the object is stored in response to updating the popularity metric of the object, and arrange the optical media in the optical media storage system based on the updated medium popularity metric.

The arrangement of media in a storage system has an impact on the amount of time it takes for the system to perform a data based operations such as read requests, write operations, deletions, etc. Conventional products fail to maintain metrics on the frequency or number of times which a given portion of data is accessed and/or referenced and use such metrics to organize the data within a storage system. As a result, conventional products experience slower access times, latency, backlogging of requests, etc.

In sharp contrast, various embodiments included herein are able to significantly improve the access time of storage systems over conventional products. By implementing reference and access counts for each object stored in an optical media storage system, the storage system may be able to maintain a popularity metric of each of the objects which may be used to achieve these significant improvements, e.g., as will be described in further detail below.

Now referring to FIG. 1, a flowchart of a computer-implemented method 100 is shown according to one embodiment. The method 100 may be performed in accordance with the present invention in any of the environments depicted herein, among others, in various embodiments. However, it should be noted that some of the operations included in method 100 are performed on data stored as objects in object-based storage on optical media. Data may be stored as objects in object based storage systems. Object based storage is a computer data storage architecture which manages data as objects, as opposed to other storage architectures like file systems which manage data as a file hierarchy, and block storage which manages data as blocks within sectors and tracks. Each object typically includes the data itself, a variable amount of metadata, and a globally unique identifier. Object storage may be implemented at multiple levels, including the device level (e.g., on an object storage device), the system level, the interface level, etc. Moreover, object storage may desirably be able to enable interfaces which can be directly programmable by the application, a namespace that can span multiple instances of physical hardware, and data management functions like data replication and data distribution at object-level granularity.

More or less operations than those specifically described in FIG. 1 may be included in method 100, as would be understood by one of skill in the art upon reading the present descriptions. Moreover, each of the steps of the method 100 may be performed by any suitable component of the operating environment. For example, any one or more of the operations in method 100 may be performed (e.g., implemented) by a virtual controller. However, in various other embodiments, the method 100 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 1, operation 102 of method 100 includes maintaining a reference count and an access count for each of a plurality of objects stored in memory. The objects are preferably stored on optical media in an optical media storage system. Moreover, the optical media may include DVDs, CDs, Blu-ray discs, etc., or any other type of optical media which is preferably able to implement object based storage thereon.

Maintaining the reference count and access count preferably includes incrementing the respective count each time a given object is referenced or accessed. It follows that the reference count and access count maintained for each object may indicate a number of times the portion of data in the object has been referenced and accessed, respectively. The reference count and/or access count may be maintained (e.g., managed) by a virtual controller included in the storage system. Moreover, the reference count and/or access count may be stored as metadata in memory which may be located in the storage system or elsewhere, e.g., an external memory location wirelessly connected to the virtual controller or other computing component at (e.g., in) the storage system.

Data may be accessed each time a read request, write operation, deletion, etc. is performed by the storage system on the data. Data access operations may be received from a user, a processor, another storage system, etc. depending on the approach. Moreover, in some approaches, data access operations may be received and processed by a virtual controller which corresponds to the optical media storage system.

An object may be referenced each time the data included in the object is uploaded by a user, pointed to by a process, copied and/or renamed, updated, etc. According to an example, which is in no way intended to limit the invention, a first user may upload a picture to the storage system. Subsequently, a second user may upload the same picture to the same storage system whereby a reference count of the object(s) corresponding to the picture uploaded by the first user is incremented by a predefined amount (e.g., by a base unit) rather than storing a second copy of the same picture elsewhere in the storage system. Not only does this improve efficiency of memory use, it may also result in reduced data access times, e.g., as will soon become apparent.

Referring still to method 100, operation 104 includes using the reference count and access count to create a popularity metric for each of the plurality of objects. As mentioned above, the reference count and access count may denote the number of times a given object is referenced and accessed respectively. Thus, by combining the reference and access counts, a popularity metric for the object may be formed. According to the present description, a "popularity metric" represents a system or standard of measuring the frequency and/or overall number of times a given object is used by the storage system. Thus, objects having a higher popularity metric are used more frequently than objects having a lower popularity metric. However, it should be noted that "higher" and "lower" are in no way intended to limit the invention, but rather are used to indicate a comparative relationship to each other. Therefore, in other approaches equivalent determinations may be made as to how the popularity metrics of two different objects compare.

Moreover, for each medium in the storage system having one or more of the plurality of objects, operation 106 includes creating a medium popularity metric based on the popularity metrics of the one or more objects on the respective medium. According to some approaches, a medium popularity metric may be created for a given medium of the storage system by combining (e.g., calculating an average value, determining a median value, etc.) the popularity metrics of the one or more objects stored on the medium. However, a medium popularity metric may be created differently according to any desired process which would be apparent to one skilled in the art after reading the present description.

By combining the popularity metrics of the objects stored on a given medium, an identifier corresponding to the frequency and/or overall number of times the given medium is used by the storage system may be achieved. Thus, it may be determined that a medium having a higher popularity metric is used more frequently than a medium which has a lower popularity metric. However, it should again be noted that "higher" and "lower" are in no way intended to limit the invention, but rather are used to indicate a comparative relationship to each other. Therefore, in other approaches equivalent determinations may be made as to how the popularity metrics of two different media compare as well.

Method 100 further includes using the medium popularity metric of each respective optical medium to arrange the optical media in the optical media storage system. See operation 108. As mentioned above, the popularity metrics of the media represent a frequency and/or overall number of times the given medium is used by the storage system. Accordingly, the popularity metrics may be used to organize the media preferably such that the system is able to more efficiently perform data operations, e.g., such as read requests, write operations, deletions, data copying, updates to the data, etc.

According to a preferred approach, using the medium popularity metric of each respective optical medium to arrange the optical media includes organizing the optical media included in the optical media storage system such that a given optical medium is positioned closer to an optical media drive than optical media having lower respective medium popularity metrics than a medium popularity metric of the given optical medium. In other words, the medium popularity metrics of the media are preferably used to position more popular media closer to a media drive than less popular media.

As a result, the media is preferably organized in the storage system such that the medium popularity metric of each medium decreases (or is at least the same) as the distance from the drive to the given medium increases. When organizing (e.g., rearranging) optical media included in the optical media storage system to achieve or maintain this preferred arrangement, the medium popularity metrics thereof are preferably used. For example, the medium popularity metric of a first medium is preferably compared to the medium popularity metrics of the other media included in the system. Once a second medium located closer to a drive and also having a medium popularity metric lower than that of the first medium is identified, a robotic accessor may simply swap the locations in which the first and second media are stored such that they effectively exchange their locations in the system. In other approaches, the first medium may be removed from its storage location and every media between the storage location of the first medium and the storage location of the second medium may be moved over one space, thereby effectively trickling down the media such that the first medium may be placed in the location the second medium was formerly stored.

By placing media containing popular objects closer to optical drives based on the reference and access counts, improved seek times, reduced latency, reduced retrieval times of objects, etc., may be achieved in an active archival storage appliance. Moreover, wear and tear of a robotic accessor used to traverse the storage system and transport the media between their storage location and a drive may be reduced at the same time.

As described above, an automated robotic accessor may traverse the storage system on an axle along the length of the storage system (e.g., appliance) and preferably moves the media, e.g., from their respective storage slots to the media drives and back, between different storage slots, etc. Thus, organizing the optical media included in the optical media storage system may be performed by an automated robotic accessor (e.g., see accessor 414 of FIG. 4). It follows that the accessor is preferably configured to selectively engage the media at least one at a time. According to one approach, a gripper assembly of the accessor may be configured to selectively engage at least one medium at a time. For example, the media included in the storage system preferably includes optical media which may include DVDs, CDs, Blu-ray discs, etc., or any other type of optical media which is preferably able to implement object based storage thereon. Therefore the automated robotic accessor may have a gripper assembly which is able to securely attach to an optical disc, transport it to another location in the storage system (e.g., to an optical drive), place the disc in a drive, etc. without damaging the disc and/or losing any data. The automated robotic accessor may achieve this by using suction-cups, a protrusion which engages a center opening in a disc, gripper members which are able to grasp outer edges of an optical medium, etc.

Figure 2A:
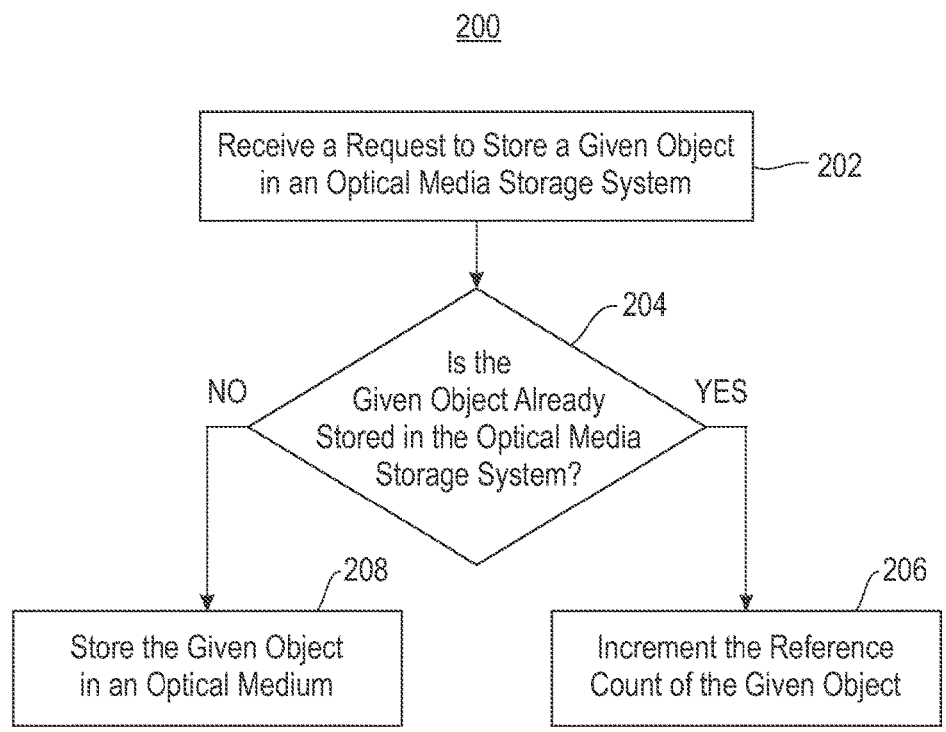
FIG. 2A is a flowchart of a method in accordance with one embodiment.
Figure 2B:
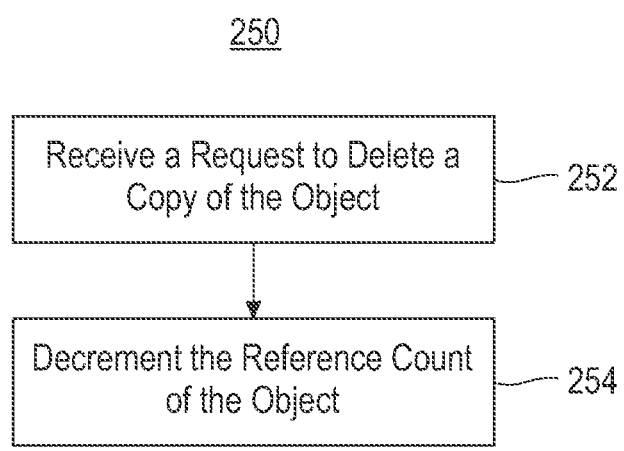
FIG. 2B is a flowchart of a method in accordance with one embodiment.

Looking now to FIGS. 2A-2B, flowcharts of two computer-implemented methods 200, 250 are shown according to two in-use examples of maintaining a reference count and an access count for each of a plurality of objects stored in memory, which is in no way intended to limit the invention. The methods 200, 250 may be performed in accordance with the present invention in any of the environments depicted in FIG. 1, among others, in various embodiments. Of course, more or less operations than those specifically described in FIGS. 2A-2B may be included in methods 200, 250, as would be understood by one of skill in the art upon reading the present descriptions.

Each of the steps of the methods 200, 250 may be performed by any suitable component of the operating environment. For example, in various embodiments, the methods 200, 250 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the methods 200, 250. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2A, operation 202 of method 200 includes receiving a request to store a given object in an optical media storage system. Moreover, decision 204 includes determining whether the given object is already stored in the optical media storage system.

Method 200 proceeds to operation 206 and increments the reference count of the given object in response to determining that the given object is already stored in the optical media storage system. However, method 200 proceeds to operation 208 in response to determining that the given object is not already stored in the optical media storage system. There, operation 208 includes storing the given object in an optical medium. The optical medium on which the received object is stored may be selected according to various approaches. For instance, in some approaches the object may be stored on an optical medium already loaded in an optical drive. In other approaches, the object may be stored on a designated optical medium, an optical medium having a least amount of data stored thereon, an optical medium stored closest to an optical drive, etc.

It follows that decision 204 is effectively implemented to deduplicate data (objects) received. As a result, only one copy of each portion of data may be stored in the optical media storage system which desirably improves data storage efficiency thereof. Data may also be deduplicated in other ways depending on the desired embodiment. For instance, data received may be deduplicated by implementing hash values for incoming data objects and looking up fingerprint information associated with the hash values in order to determine whether the data has already been stored in the storage system as would be appreciated by one skilled in the art after reading the present description.

Referring now to FIG. 2B, method 250 includes receiving a request to delete a copy of the object. See operation 252. Moreover, operation 254 includes decrementing (e.g., decreasing) the reference count of the object in response to receiving the request to delete the copy of the object. As mentioned above, only one copy of each portion of data may be stored in the optical media storage system. Thus, when a portion of data is added to (uploaded to) the storage system which is the same as another portion of data already stored in the storage system, the reference count corresponding to that portion of data in the storage system is incremented rather than adding a second copy of the data. Therefore, when a request to delete a portion of data is received, the reference count corresponding to the object(s) associated with the portion of data requested to be deleted is decremented rather than actually deleting the data. If the data were deleted in response to receiving a deletion request, the data would no longer be stored in the storage system and subsequent access requests for the deleted data received from other users would be denied (e.g., failed). However, in some approaches, a portion of data may be deleted in response to receiving a deletion request which corresponds to one or more objects, each of the objects having a reference count with a value of zero.

Figure 3:
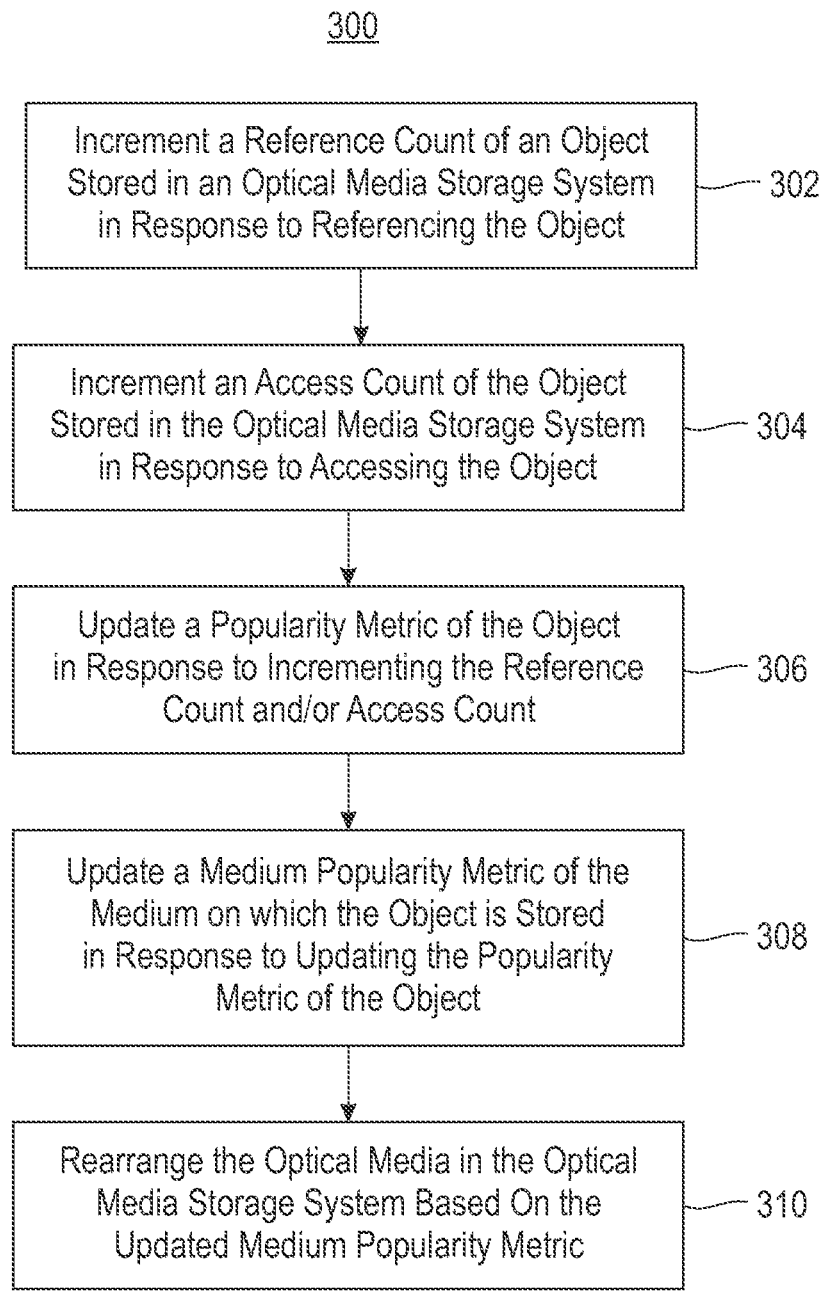
FIG. 3 is a flowchart of a method in accordance with one embodiment.

Now referring to FIG. 3, a flowchart of a computer-implemented method 300 is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, operation 302 of method 300 includes incrementing a reference count of an object stored in an optical media storage system in response to referencing the object. As mentioned above, an object may be referenced in response to receiving a request to reference (e.g., store a copy of) the data corresponding to the object. Moreover, operation 304 includes incrementing an access count of the object stored in the optical media storage system in response to accessing the object. Again, as described above, an object may be accessed in response to receiving a request to access (e.g., read, update, modify, etc.) data corresponding to the object. Requests to access and/or requests to reference a given medium and/or one or more of the objects stored thereon may be received form a user, a computing component (e.g., a virtual controller), an administrator, etc.

Operation 306 includes updating a popularity metric of the object in response to incrementing the reference count and/or access count. As an object is accessed and/or referenced, the popularity metric corresponding to the object changes to represent the current popularity metric of the object. Moreover, it is preferable that the popularity metrics of the objects in a storage system as described herein are updated regularly such that the popularity metrics accurately represent the status of the objects. According to different approaches, the popularity metrics may be updated automatically upon detecting the access count and/or reference count have changed, after a predetermined amount of time has passed, in response to receiving a request from a user, etc. However, it should be noted that the medium popularity metric of a medium may be updated at a different rate than the rate at which the popularity metric of each of the objects stored on the medium are updated, e.g., depending on the desired embodiment. For example a medium popularity metric may be updated less frequently than the popularity metrics of the objects stored on the medium are updated.

Similarly, operation 308 includes updating a medium popularity metric of the medium on which the object is stored in response to updating the popularity metric of the object. Again, as popularity metrics of the objects stored in a given medium change, the medium popularity metric corresponding to the medium preferably changes also to represent the current medium popularity metric of the medium and the objects stored therein. Moreover, it is preferable that the medium popularity metrics of the media in a storage system as described herein are updated regularly such that the medium popularity metrics accurately represent the status of the media. Accordingly, in different approaches, the medium popularity metrics may be updated automatically upon detecting the access count and/or reference count have changed, after a predetermined amount of time has passed, in response to receiving a request from a user, etc.

Furthermore, operation 310 includes rearranging the optical media in the optical media storage system based on the updated medium popularity metric. In preferred approaches, rearranging the optical media in the optical media storage system based on the updated medium popularity metric includes organizing the optical media included in the optical media storage system such that a given optical medium is positioned closer to an optical media drive than optical media having lower respective medium popularity metrics than a medium popularity metric of the given optical medium. As described above, arrangement of the optical media in the system is preferably based (at least in part) on the popularity metrics of the objects themselves and the medium popularity metrics of the media. The popularity metrics and media popularity metrics are preferably used to position more popular media closer to a media drive than less popular media. By placing media containing popular objects closer to optical drives based on the reference and access counts, system performance is desirably improved by reducing seek times, reduced latency, reduced retrieval times of objects, etc., may be achieved in an active archival storage appliance. Moreover, wear on a robotic accessor used to traverse the storage system and transport the media between their storage location and a drive as described above may be reduced at the same time.

Rearrangements of the media is preferably performed in a manner which does not disrupt performance of the storage system as a whole. Thus it is desirable that the media is rearranged at a point of low system throughput. However, in some instances the media may be rearranged in the storage system as a result of receiving a request from a user, upon a predetermined condition being met, after an amount of time has passed since a last rearrangement of the media, etc., depending on the desired embodiment. In yet another approach, the desired storage location for a given medium may be reevaluated when the medium is removed from a drive and is sent back to be stored in the system.

Figure 4:
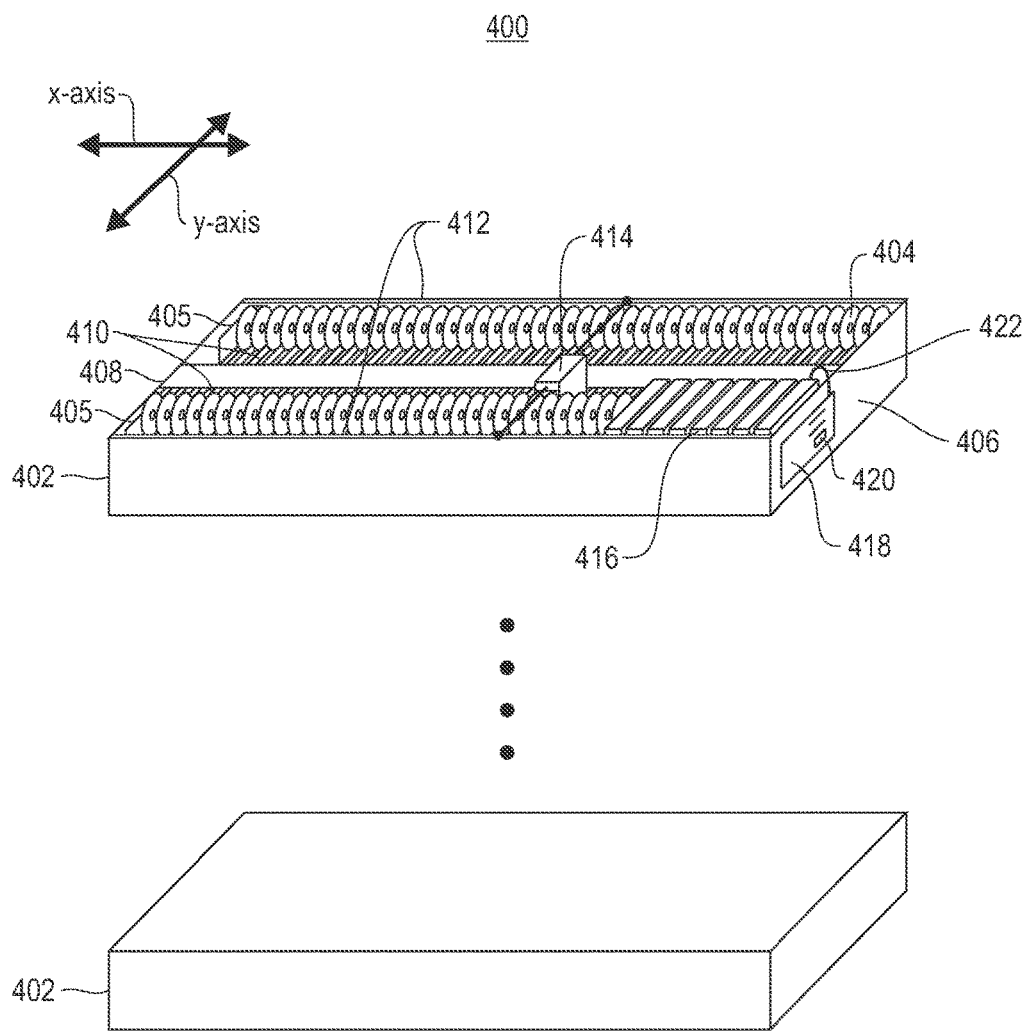
FIG. 4 is a representative view of an object storage system in accordance with one embodiment.

According to an in-use embodiment, which is in no way intended to limit the invention, any one of the methods described herein may be implemented by a virtual controller on an active archival object storage system using optical media. Referring now to FIG. 4, an active archival optical storage system 400 is illustrated in accordance with one embodiment. As an option, the present object storage system 400 may be implemented in conjunction with features from any other embodiment listed herein, such as those described with reference to the other FIGS., such as FIGS. 1-3. However, such object storage system 400 and others presented herein may be used in various applications and/or in permutations which may or may not be specifically described in the illustrative embodiments listed herein. Further, the object storage system 400 presented herein may be used in any desired environment. Thus FIG. 4 (and the other FIGS.) may be deemed to include any possible permutation.

Although only two are actually shown, the active archival object storage system 400 may include a number of (e.g., 10) optical storage units 402. According to an illustrative approach, each of the optical storage units 402 may be a 4U full length appliance, each of which are capable of holding (storing) approximately 800 optical discs 404. However, in other approaches one or more of the optical storage units 402 may be a 5U, 6U, 7U, etc., full length appliances. As shown in the storage unit 402 which has an upper lid thereof removed, the discs 404 may be arranged in two trays 405 (e.g., rows) which extend along the length of the storage unit 402 in the x-axis from a front side 406 to a back side 408 of the storage unit 402. Moreover, the optical discs 404 are stored (e.g., secured) in disc slots 410 which abut guide rails 412 extending along outer sides of the storage unit 402.

An automated robotic accessor 414 is positioned between the two trays 405 of optical discs 404 and supported by members which are coupled to the guide rails 412. The automated robotic accessor 414 is preferably used to transport optical discs 404 between the plurality of disc slots 410 and/or the optical drives 416 included in the storage unit 402. Accordingly, the automated robotic accessor 414 may be positionable along the x-axis and the y-axis by moving along the guide rails 412 and the members coupled thereto, the movement being caused by a motor. The automated robotic accessor 414 also preferably has a gripping mechanism which is able to selectively engage one or more of the optical discs 404. Therefore the automated robotic accessor 414 may be used to reorganize the optical discs 404 inside a given storage unit 402 according to any of the approaches described herein.

As mentioned above, objects stored in the appliance are preferably deduplicated. Thus, if multiple users upload same object with different names, only a single copy of the object may be stored with a reference count indicating how many names are referring to the single object. This reference count may serve as an indicator for popularity of the object as described herein. Moreover, an access count (how many times this object is accessed) is also maintained for the object. The access count metric also indicates the popularity of the object. The reference count combined with the access count will result in overall popularity metric of the given object. The optical discs containing objects with a higher overall popularity are preferably moved closer to the optical drives in the storage unit compared to optical discs containing objects with a lower overall popularity. Therefore, when objects are retrieved in response to receiving a request, the robotic accessor can load a corresponding optical disc into an optical drive more quickly, thereby resulting in reduced latency for object retrieval and improved life of the robot.

As mentioned above, the storage unit 402 includes optical drives 416 which may be positioned throughout the appliance. However, according to the embodiment illustrated in FIG. 4, all of the optical drives 416 are positioned in a same corner of the storage unit 402, near system host board 418 and Ethernet port 420.

The system host board 418 may be used to receive, stage, process, etc. operations received by the storage unit 402, e.g., from a virtual controller. According to an example, which is in no way intended to limit the invention, the system host board 418 may be a low processing CPU capable of performing received PUT operations, GET operations, DELETE OBJECT operations, etc. Moreover, the Ethernet port 420 may be used to form a connection between the given storage unit 402 and a virtual controller, e.g., as will be described in further detail below. However, in other approaches the Ethernet port 420 may be used to couple more than one storage unit 402 together. It should also be noted that other types of connection ports may be implemented in place of the Ethernet port 420, e.g., depending on the desired embodiment. Moreover, a computer bus interface 422 (e.g., a Serial AT Attachment (SATA) interface) is included. According to some approaches, the computer bus interface 422 may be used to connect host bus adapters to one or more of the optical drives 416, e.g., as would be appreciated by one skilled in the art after reading the present description.

Figure 5:
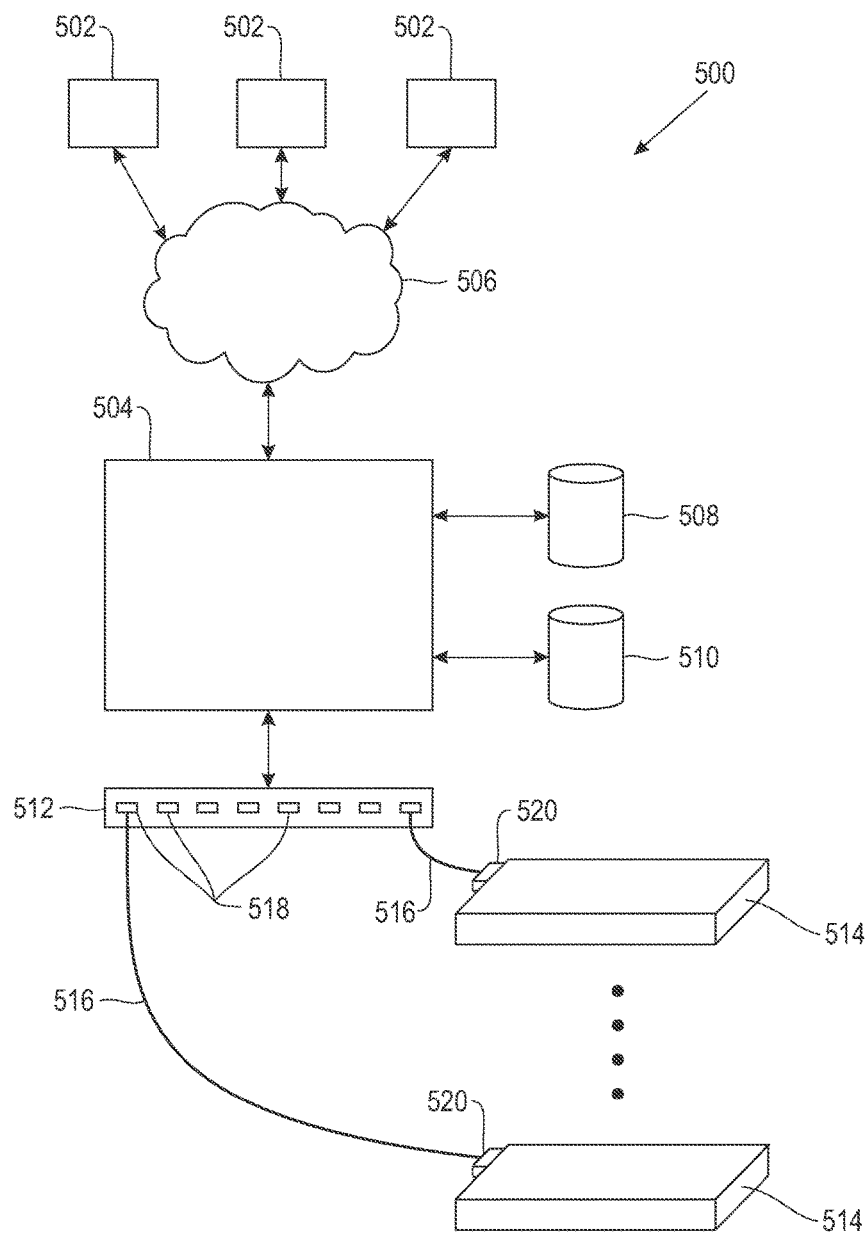
FIG. 5 is a representative view of an object storage system in accordance with another embodiment.

Referring now to FIG. 5, an object storage system 500 is illustrated in accordance with one embodiment. As an option, the present object storage system 500 may be implemented in conjunction with features from any other embodiment listed herein, such as those described with reference to the other FIGS., such as FIGS. 1-4. However, such object storage system 500 and others presented herein may be used in various applications and/or in permutations which may or may not be specifically described in the illustrative embodiments listed herein. Further, the object storage system 500 presented herein may be used in any desired environment. Thus FIG. 5 (and the other FIGS.) may be deemed to include any possible permutation.

As shown, the object storage system 500 includes a plurality of user locations 502 (e.g., client locations) which are coupled to a virtual controller 504 via a network 506. Accordingly, the virtual controller 504 may receive different requests from the user locations 502. The requests may include, but are not limited to, PUT requests, GET requests, DELETE OBJECT requests, etc. Moreover, in different approaches, the network 506 may be, but is not limited to, a local area network (LAN), a wide area network (WAN) such as the Internet, public switched telephone network (PSTN), internal telephone network, etc.

The virtual controller 504 is preferably able to perform any one or more of the operations described above, e.g., with reference to FIGS. 1-3. Accordingly, virtual controller 504 is coupled to local memory 508, 510 which may be used to store various data and/or metadata associated with the storage system. For example, in some approaches local memory 508 may be an object database and may be used to store information pertaining to names (e.g., unique identifiers) of the objects stored in the storage system, hash based fingerprint information corresponding to objects stored in the storage system, one or more optical medium as described herein, etc. In other approaches, local memory 510 may be a fingerprint database which stores hash based fingerprint information corresponding to objects stored in the storage system, metadata related to where certain objects (data) is stored on the media, a reference count of one or more objects, an access count of one or more objects, etc.

The virtual controller 504 is also coupled to an Ethernet switch 512 of a type known in the art. The Ethernet switch 512 in turn couples the virtual controller 504 to each of the optical storage units 514 included in the object storage system 500. Again, although only two optical storage units 514 are actually shown in the present embodiment, the object storage system 500 may include a plurality of (e.g., 10) optical storage units. In a specific approach, a first end of an Ethernet cable 516 may be coupled to a port 518 in the Ethernet switch 512, while a second end of the Ethernet cable is coupled to a host module 520 of a respective one of the optical storage units 514. Accordingly, the virtual controller 504 may be able to perform any one or more of the operations described herein on any of the optical storage units 514 as would be appreciated by one skilled in the art after reading the present description.

It should be noted that any of the components included in the object storage system 500 may be coupled (e.g., electrically connected) to each other wirelessly, e.g., via Wi-Fi, Bluetooth, a WAN, etc., or using a physical connection, e.g., such as one or more wires, a logical bus, one or more cabled, etc.

It follows that various embodiments included herein are able to significantly improve the access time of storage systems over conventional products. As described above, implementing reference and access counts for each object stored in an active archival object storage appliance using optical media allows for the storage system to maintain a popularity metric of each of the objects as well as the optical media the objects are stored on. Moreover, arrangement of the optical media in the system is preferably based (at least in part) on the popularity metrics of the optical media and/or the popularity metrics of the objects themselves. By positioning optical media with higher popularity metrics closer to a optical media drive than optical media with lower popularity metrics as described above, system performance is desirably improved by reducing seek times, decreasing object retrieval times, increasing lifetime of robotic accessors used to move the object media, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as a processor or controller. The memory elements can include local memory employed during actual execution of the program code, such as nonvolatile memory, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
maintaining a reference count and an access count for each of a plurality of objects stored in an optical media storage system;
using the reference count and access count to create a popularity metric for each of the plurality of objects;
for each medium having one or more of the plurality of objects, creating a medium popularity metric based on the popularity metrics of the one or more objects on the respective medium; and
using the medium popularity metric of each respective optical medium to arrange the optical media in the optical media storage system.

2. The computer-implemented method of claim 1, comprising:
receiving a request to store a given object in an optical media storage system;
determining whether the given object is already stored in the optical media storage system;
incrementing the reference count of the given object in response to determining that the given object is already stored in the optical media storage system; and
storing the given object in an optical medium in response to determining that the given object is not already stored in the optical media storage system.

3. The computer-implemented method of claim 1, comprising:
decrementing the reference count of an object in response to receiving a request to delete the object.

4. The computer-implemented method of claim 1, wherein using the medium popularity metric of each respective optical medium to arrange the optical media includes:
organizing the optical media included in the optical media storage system such that a given optical medium is positioned closer to an optical media drive than optical media having lower respective medium popularity metrics than a medium popularity metric of the given optical medium.

5. The computer-implemented method of claim 4, wherein organizing the optical media is performed by a robotic accessor configured to selectively engage the optical media.

6. The computer-implemented method of claim 1, wherein the optical media are selected from a group consisting of DVDs, CDs, and Blu-ray discs.

7. The computer-implemented method of claim 4, wherein the optical media are Blu-ray discs, wherein organizing the optical media included in the optical media storage system such that a given optical medium is positioned closer to an optical media drive than optical media having lower respective medium popularity metrics than a medium popularity metric of the given optical medium reduces retrieval times of objects stored in the optical media storage system.

8. A computer program product comprising a computer readable storage medium having program instructions embodied therewith, wherein the computer readable storage medium is not a transitory signal per se, the program instructions readable and/or executable by a processor to cause the processor to perform a method comprising:
incrementing a reference count of an object stored in an optical media storage system in response to referencing the object;
incrementing an access count of the object stored in the optical media storage system in response to accessing the object;
updating a popularity metric of the object in response to incrementing the reference count and/or access count;
updating a medium popularity metric of the medium on which the object is stored in response to updating the popularity metric of the object; and
arranging the optical media in the optical media storage system based on the updated medium popularity metric.

9. The computer program product of claim 8, the program instructions readable and/or executable by the processor to cause the processor to perform the method comprising:
receiving a request to store a given object in an optical media storage system;
determining whether the given object is already stored in the optical media storage system;
incrementing the reference count of the given object in response to determining that the given object is already stored in the optical media storage system; and
storing the given object in an optical medium in response to determining that the given object is not already stored in the optical media storage system.

10. The computer program product of claim 8, wherein the optical media are selected from a group consisting of DVDs, CDs, and Blu-ray discs.

11. The computer program product of claim 8, wherein arranging the optical media in the optical media storage system based on the updated medium popularity metric includes:
organizing the optical media included in the optical media storage system such that a given optical medium is positioned closer to an optical media drive than optical media having lower respective medium popularity metrics than a medium popularity metric of the given optical medium.

12. The computer program product of claim 11, wherein organizing the optical media is performed by a robotic accessor configured to selectively engage the optical media.

13. The computer program product of claim 11, the program instructions readable and/or executable by the processor to cause the processor to perform the method comprising:
receiving a request for an object; and
using a robotic accessor to load an optical disk corresponding to the requested object in an optical drive,
wherein organizing the optical media included in the optical media storage system such that a given optical medium is positioned closer to an optical media drive than optical media having lower respective medium popularity metrics than a medium popularity metric of the given optical medium reduces an amount of time associated with loading the optical disk corresponding to the requested object in the optical drive.

14. A system, comprising:
a processor; and
logic integrated with the processor, executable by the processor, or integrated with and executable by the processor, the logic being configured to:
increment a reference count of an object stored in an optical media storage system in response to referencing the object;
increment an access count of the object stored in the optical media storage system in response to accessing the object;

update a popularity metric of the object in response to incrementing the reference count and/or access count;

update a medium popularity metric of the medium on which the object is stored in response to updating the popularity metric of the object; and arrange the optical media in the optical media storage system based on the updated medium popularity metric.

15. The system of claim 14, the logic being configured to:

receive a request to store a given object in an optical media storage system;

determine whether the given object is already stored in the optical media storage system;

increment the reference count of the given object in response to determining that the given object is already stored in the optical media storage system; and store the given object in an optical medium in response to determining that the given object is not already stored in the optical media storage system.

16. The system of claim 14, wherein the optical media are selected from a group consisting of DVDs, CDs, and Blu-ray discs.

17. The system of claim 14, comprising:

at least one optical drive; and an automated robotic accessor configured to selectively engage the optical media, wherein the automated robotic accessor includes a gripping mechanism which is configured to selectively engage the optical media, wherein arranging the optical media is performed by the robotic accessor.

18. The system of claim 14, the logic being configured to:

decrement the reference count of an object in response to receiving a request to delete the object.

19. The system of claim 14, wherein arranging the optical media in the optical media storage system based on the updated medium popularity metric includes:

organizing the optical media included in the optical media storage system such that a given optical medium is positioned closer to an optical media drive than optical media having lower respective medium popularity metrics than a medium popularity metric of the given optical medium.

20. The system of claim 19, comprising a robotic accessor configured to selectively engage the optical media, wherein organizing the optical media is performed by the robotic accessor.

* * * * *